2,718,453

METHOD FOR REDUCING SULFUR COMPOUNDS FROM FLUE GASES

John W. Beckman, Oakland, Calif.

No Drawing. Application January 3, 1951,
Serial No. 204,289

1 Claim. (Cl. 23—2)

This invention relates to a process for the elimination or reduction of sulfur dioxide and sulfur trioxide from flue gases. It is well-known that most industrial fuels such as coal, gas and oil contain sulfur either in the form of elemental sulfur, or as sulfur compounds, and that when such fuels are burned, sulfur dioxide and sulfur trioxide are products of the combustion. These gases contaminate the atmosphere, leading to a very undesirable condition, and are believed to be one of the principal offenders in the production of the "smog" which now surrounds many industrial areas. The "smog" problem has become a serious one in recent years and many efforts have been made to find a solution to it, but no wholly satisfactory solution has heretofore been found.

It is an object of the present invention to provide a method for eliminating sulfur dioxide and sulfur trioxide from fuel gases using inexpensive, readily available materials and without the use of expensive equipment.

It is a further object of the present invention to provide a means of burning fuel containing sulfur wherein no solid material will be deposited on the surfaces defining a combustion zone or a heat exchanger.

Other objects of the invention will be apparent from reading the specification.

In a companion patent application I have shown that certain chemical compounds, when injected into a burning fuel in a combustion zone, will react with the sulfur compounds present in the products of combustion to produce relatively innocuous solid products. This is a very advantageous process, but it has been found that in many instances the solid products of the reaction are deposited on the heat exchange areas such as the tubes in a boiler. It has been found that the sulfur dioxide and trioxide which are formed in burning a fuel containing sulfur will react with the compounds which are hereinafter disclosed at much lower temperatures than those encountered in the actual flame area of a heating installation. The present invention, therefore, relates to the injection of certain compounds in the combustion gases produced by sulfur containing fuel at a point other than the actual flame itself.

The compounds which are used are the oxides, hydroxides and carbonates of the metals of the alkaline earth series, particularly calcium and magnesium including mixtures of these compounds. Of these compounds, the oxide, hydroxide and carbonate of calcium are preferred since they are readily available, inexpensive and yield good results in the present process. The compounds do not need to be pure. For instance, fly ash dust collected from an electrostatic precipitator when coal was burned was found to be suitable for use in the process. In the following description, particular reference will be made to calcium carbonate since it is typical of these compounds, but it must be understood that any of the other compounds or mixtures may be substituted for the calcium carbonate.

In use, the compound, such as calcium carbonate, is first finely ground so that it is in the form of a very fine powder. This serves two purposes. In the first place, the fine state of division enables the powder to be more readily introduced into the combustion gases of the heating unit in this form and, in the second place, the fine grinding serves to increase the surface area of the calcium carbonate so that it reacts more readily with the sulfur dioxide or trioxide. The finely ground calcium carbonate may be introduced at any point in a heating installation so long as the ambient gases have a temperature of at least 350° F. It is preferred to introduce the calcium carbonate at a point in the heating installation where the temperature is somewhat above 350° F. so that the sulfur dioxide and trioxide will have sufficient time to react with the calcium carbonate before the gases dissipate their heat and react at a temperature below 350° F.

When calcium carbonate is used the gas temperature does not appear to be at all critical, but when calcium hydroxide is used, the completeness of the reaction rises with increased temperatures. Thus, when feeding calcium hydroxide in the form of dust, in the temperature range 350° F. to 650° F., it was found that the absorption of sulfur dioxide rose from 36% at 350° F. to 80% at 650° F.

The calcium carbonate is ordinarily ground to a fine powder, say 300 mesh, and is preferably blown into the combustion gases of the heating installation, but it is possible to provide contact between the effluent gases and the calcium carbonate in other manners. For instance, a series of baffles can be arranged in a flue in such a way that the upper surface of the baffles forms a series of trays, and the calcium carbonate may be distributed on these trays. However, it is apparent that such a process would not give as efficient contact between the gases and calcium carbonate as would the blowing of the calcium carbonate directly into the exit gas.

Since the temperature of combustion gases discharged into a flue is frequently higher than 350° F., it is practical to blow the calcium carbonate into the flue gases at almost any point in the heating installation. For instance, if one is operating a boiler installation, it is entirely practical to inject the finely divided calcium carbonate in the gases after they have passed over the tubes of the boiler and thus avoid any possibility of depositing reaction products on the tubes of the boiler.

The amount of calcium carbonate to be used can be readily calculated from the amount of sulfur which is present in the fuel. For instance, if one were using a fuel which contained 3% sulfur (expressed as elemental sulfur), one should inject approximately 9% of the fuel as calcium carbonate in the combustion gases. Even better results will be obtained if one uses more than the stoichiometric amount of the calcium carbonate in accordance with the reactions which will be presently set forth.

For instance, when using calcium carbonate in flue gas having a temperature of 650° F., the absorption of sulfur dioxide rose from 45%, when the theoretical amount of calcium carbonate was fed, to 88% when nine times this amount was fed.

It has been found that the process is more efficient if there is a slight amount of water vapor present in the combustion gases. However, it is ordinarily not necessary to add any water vapor to the gases for the reason that industrial fuels contain combined hydrogen which is burned to produce the necessary water. When calcium hydroxide is used it has been found that the addition of moisture has no beneficial effect, while if calcium carbonate is used, a slight amount of additional moisture has been found to be helpful.

It has also been found desirable to have a small amount of ammonia present in the gases which are being treated in accordance with the present invention. The exact function of the ammonia is not known, but it is hypothesized that the ammonia acts as a catalyst in the reaction between the sulfur compound and the calcium carbonate. The amount of ammonia which is employed is very small, in fact, it is so small that it would have no appreciable effect upon the neutralization of the acidic sulfur compounds. The amount of ammonia which is present should be not over 2% of the amount necessary to neutralize the sulfur dioxide and sulfur trioxide which are present in the effluent gas.

Although this invention is not predicated on the theory of its operation, the following is offered as a possible explanation of reactions which occur. At the temperatures contemplated for the introduction of calcium carbonate with sulfur dioxide and trioxide, it is apparent that the calcium carbonate would not be dissociated to calcium oxide and carbon dioxide. Therefore, it would seem that a direct reaction must take place between the calcium carbonate and the sulfur dioxide and sulfur trioxide and it is hypothesized that the following reactions occur:

$$CaCO_3 + SO_2 \rightarrow CaSO_3 + CO_2$$
$$CaCO_3 + SO_2 + 1/2 O_2 \rightarrow CaSO_4 + CO_2$$
$$CaCO_3 + SO_3 \rightarrow CaSO_4 + CO_2$$

As can be seen from the above reactions, the final product of the reaction between sulfur compounds and the calcium carbonate is calcium sulfate or calcium sulfite. Both of these compounds are relatively innocuous and are substantially neutral so that they can be released into the atmosphere with far less objection as compared to sulfur dioxide or sulfur trioxide. However, since both calcium sulfite and sulfate are solids at temperatures encountered in flue gases, it is easy to trap these solid substances and prevent them from being exhausted with the flue gases. This is usually done by methods well-known to those in the art such as by the use of an electrostatic precipitator, cyclonic dust collector, or by the use of a bag house.

In the claim, the term "hydrocarbon fuel" is used to designate any fuel or mixture of fuels which is made up in the main of carbon such as natural gas, oil, coal and waste products such as acid sludges and the like. The term "acid sludge" is employed in a broad sense to include the residue remaining after the refining or alkylating of various oils or hydrocarbons and containing sulfuric acid.

The following non-limiting example illustrates one method of carrying out the process of the present invention.

A heavy fuel oil was burned in a boiler and the temperature of the gases leaving the tubes of the boiler was found to be 450° F. The fuel oil contained 2.5% by weight of sulfur; finely ground limestone was blown into the flue gas at the point where it left the boiler tubes. The weight of limestone was four times the weight of sulfur in the fuel. Upon analysis of the flue gas at a point a few feet removed from the point of introduction of the limestone, it was found that 90% of the sulfur dioxide which was present in the flue gas before introduction of the limestone had been converted to solid compounds.

I claim:

In the process of removing an impurity from hot combustion gas produced by burning a sulfur containing hydrocarbon fuel, said impurity consisting of a member chosen from the group consisting of sulfur dioxide and sulfur trioxide, the improvement comprising blowing into said combustion gas while said gas is at a temperature of at least 350° F., finely divided solid calcium carbonate.

References Cited in the file of this patent
UNITED STATES PATENTS

| 1,001,992 | Sanborn | Aug. 29, 1911 |
| 1,212,199 | Eustis | Jan. 16, 1917 |
| 1,221,505 | Bradley | Apr. 3, 1917 |
| 1,624,625 | Raffloer | Apr. 12, 1927 |
| 1,626,664 | Brady | May 3, 1927 |
| 2,332,887 | Biederbeck et al. | Oct. 26, 1943 |

FOREIGN PATENTS

| 597,598 | Great Britain | Jan. 29, 1948 |
| 613,651 | Great Britain | Dec. 1, 1948 |